US007840075B2

(12) United States Patent
Vacanti

(10) Patent No.: US 7,840,075 B2
(45) Date of Patent: Nov. 23, 2010

(54) MARINE RADAR SYSTEM WITH THREE-DIMENSIONAL MEMORY

(75) Inventor: David C. Vacanti, Renton, WA (US)

(73) Assignee: Honeywell International, Inc., Morristown, NJ (US)

(*) Notice: Subject to any disclaimer, the term of this patent is extended or adjusted under 35 U.S.C. 154(b) by 35 days.

(21) Appl. No.: 12/359,478

(22) Filed: Jan. 26, 2009

(65) Prior Publication Data

US 2010/0188290 A1    Jul. 29, 2010

(51) Int. Cl.
G06K 9/68    (2006.01)
(52) U.S. Cl. .................. 382/218; 342/189; 382/278
(58) Field of Classification Search ........... 342/180, 342/189; 382/218, 278
See application file for complete search history.

(56) References Cited

U.S. PATENT DOCUMENTS

| | | | | |
|---|---|---|---|---|
| 5,097,268 | A * | 3/1992 | Bauer et al. | 342/160 |
| 5,311,188 | A | 5/1994 | Meijer et al. | |
| 5,565,879 | A * | 10/1996 | Lamensdorf | 343/781 R |
| 6,307,501 | B1 | 10/2001 | Will et al. | |
| 2003/0016155 | A1 * | 1/2003 | Szeto et al. | 342/26 |
| 2006/0210169 | A1 * | 9/2006 | Colestock et al. | 382/218 |
| 2007/0126629 | A1 * | 6/2007 | Krikorian et al. | 342/359 |

FOREIGN PATENT DOCUMENTS

WO    2006/072255 A1    7/2006

OTHER PUBLICATIONS

Bencheikh M.L. et al, "Analysis and Real Time Implementation of a Clutter Map CFAR Dectector with Noncoherent Integration," International Radar Symposium, IRS 2006, IEEE, Piscataway, NJ, USA,LNKD-DOI: 10.1109/IRS. 2006. 4338154, May 1, 2006, pp. 1-4, XP031138496, ISBN: 978-83-7207-621-2.
"Chapter 15: MTI Radar (excerpt) ED—Skolnik M.I. (ED)." Jan. 1, 1990, Radar Handbook (2nd Edition), New York, NY; McGraw Hill, US, pp. 15/60-15/71, XP007912613, ISBN: 9780070579132.

* cited by examiner

Primary Examiner—Thomas H Tarcza
Assistant Examiner—Timothy A Brainard
(74) Attorney, Agent, or Firm—Black Lowe & Graham PLLC; P. G. Scott Born

(57) ABSTRACT

A radar system includes a memory device operable to store radar-return data characterizing at least one geographic region, a database including a set of chart data representing fixed landmarks associated with the at least one geographic region, and a processor coupled to the memory device. The processor is configured to obtain from the memory device multiple sets of the radar-return data corresponding to successive scans of the at least one geographic region, perform correlation processing among the multiple data sets to yield a first correlated data set, perform correlation processing between the first correlated data set and fixed-landmark chart data associated with the at least one geographic region to yield a second correlated data set, and process the second correlated data set to remove said fixed-landmark chart data therefrom and yield a third data set representing scanned objects that are not fixed landmarks.

20 Claims, 3 Drawing Sheets

MARINE RADAR SYSTEM WITH THREE-DIMENSIONAL MEMORY

BACKGROUND OF THE INVENTION

Commercial marine radar systems are required to provide automated radar target detection and tracking of 100 targets (e.g., objects that have not been previously identified and/or charted) or more. The ability to discriminate between targets and fixed navigation objects is of great concern. It is particularly valuable to detect those targets that have, or appear to have, no apparent motion.

SUMMARY OF THE INVENTION

In an embodiment, a radar system includes a memory device operable to store radar-return data characterizing at least one geographic region, a database including a set of chart data representing fixed landmarks associated with the at least one geographic region, and a processor coupled to the memory device. The processor is configured to obtain from the memory device multiple sets of the radar-return data corresponding to successive scans of the at least one geographic region, perform correlation processing among the multiple data sets to yield a first correlated data set, perform correlation processing between the first correlated data set and fixed-landmark chart data associated with the at least one geographic region to yield a second correlated data set, and process the second correlated data set to remove said fixed-landmark chart data therefrom and yield a third data set representing scanned objects that are not fixed landmarks.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Embodiments of the invention employ processing of 2-D radar reflectivity data to detect and identify objects in a geographic region that are not fixed, or not otherwise known, landmarks. As used in this description, the term "landmark" should be interpreted to include fixed navigation aids, such as buoys, as well as geological objects, such as land masses. An embodiment provides a solution to the problem of discerning between a vessel or floating hazard and a fixed or otherwise known landmark, such as a navigation buoy, when the vessel or floating hazard has no velocity relative to the observing radar, as well as providing a direct way of allowing a radar to provide identification information for detected navigation items.

This approach differs from existing target detection and tracking concepts for marine radar in that it uses a motion-compensated marine-chart database as a distinctive memory layer to provide known locations of objects within a navigable waterway and use successive memory layers to retain detailed radar images of the surrounding water and land masses directly "above" or indexed to the motion stabilized marine chart database.

The layered 3-D memory lends itself to more advanced processing among the stored image layers for reduction of clutter due to sea state or rain, and avoidance of collisions at sea with either known fixed objects or other floating threats that are not included by a database.

Figure 1:
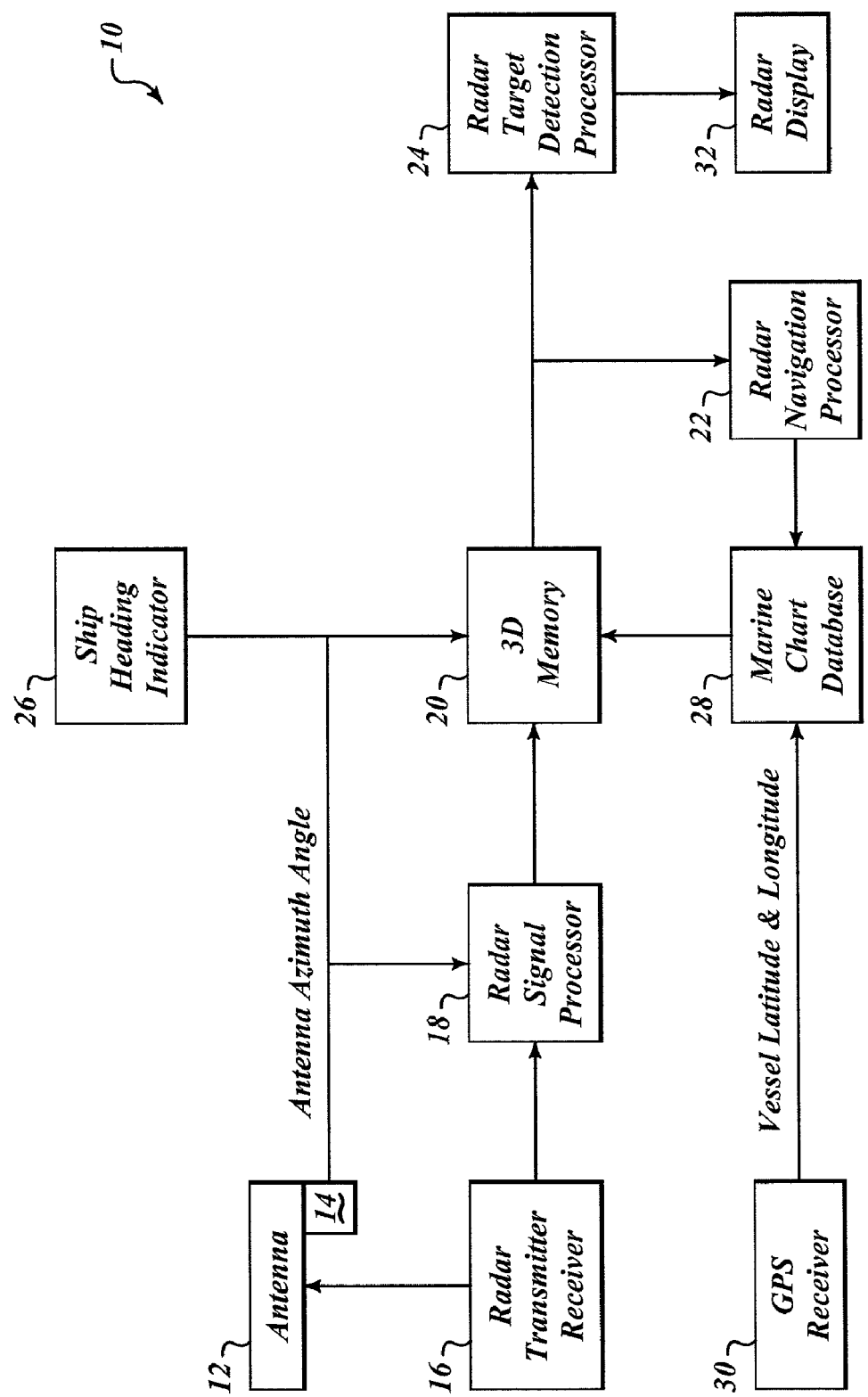
FIG. 1 illustrates an exemplary system formed in accordance with an embodiment of the present invention.

FIG. 1 illustrates a system according to an embodiment, as well as a suitable operating environment in which an embodiment of the invention may be implemented. The operating environment is only one example of a suitable operating environment and is not intended to suggest any limitation as to the scope of use or functionality of the invention.

The invention may be described in the general context of computer-executable instructions, such as program modules, executed by one or more computer processors or other devices. Generally, program modules include routines, programs, objects, components, data structures, etc. that perform particular tasks or implement particular abstract data types. Typically the functionality of the program modules may be combined or distributed as desired in various embodiments.

The system/operating environment illustrated in FIG. 1 typically includes at least some form of computer readable media, which may be associated with one or more processors and/or memory devices. Computer readable media can be any available media that can be accessed by one or more components of such operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by one or more components of such operating environment. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Embodiments of the invention include a system and computer program product for classifying a target as a vessel or floating hazard (as opposed to a fixed and/or known object such as a navigation buoy) when the radar target or floating hazard has no relative velocity to the observing radar and provides a direct means of allowing a radar to provide identification information for detected navigation items, as well as providing navigation and location verification of the vessel (not shown) on which the system is implemented. FIG. 1 illustrates an exemplary system 10 formed in accordance with an embodiment of the present invention. The system 10 includes a radar antenna 12 and a scan motor and angle indicator assembly 14 operable to provide an indication of the azimuth angle of the antenna. The system 10 further includes a radar transceiver 16, a radar-signal processor 18, a memory device 20, a radar navigation processor 22, a radar detection processor 24, a ship heading indicator 26, a marine chart database 28, a GPS receiver 30, and a radar display device 32. The memory device 20 may include or be a component of a three-dimensional buffer processing system, such as, or similar to, the RDR-4000 weather radar system manufactured by Honeywell®, including its volumetric buffer technology.

Figure 2:
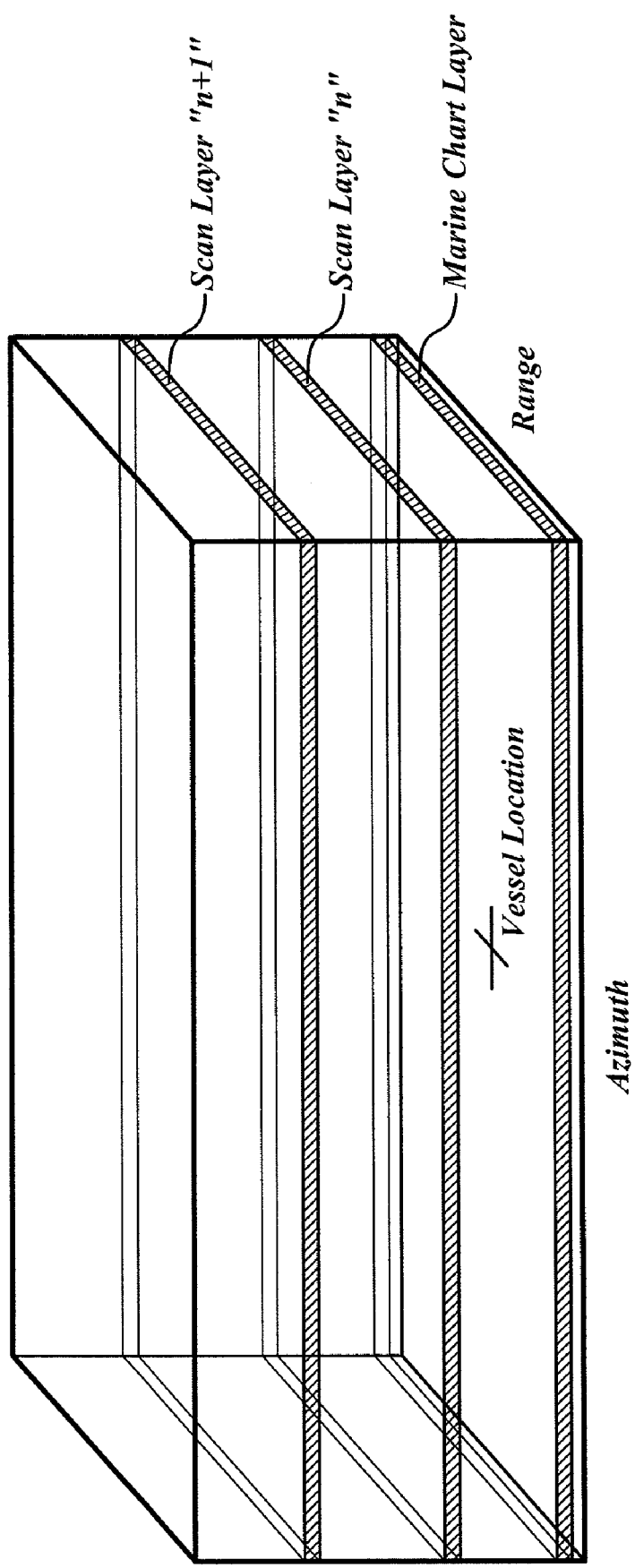
FIG. 2 illustrates conceptually the functionality of a memory device according to an embodiment.

FIG. 2 illustrates conceptually the functionality of the memory device 20 according to an embodiment. A 3-D memory is constructed that includes a "bottom" layer that provides detailed marine navigation chart data that is oriented to the latitude and longitude of vessel location and vessel direction of travel, and includes locations of known landmarks such as drying rocks, islands, navigation buoys and day marks or any other fixed charted object. Successive layers above the chart layer include radar detection data that are collected from successive 360 degree scans at a predetermined time interval Δt by the marine radar antenna 12 that can be conceptually superimposed on the chart layer. While only two scan layers are illustrated in FIG. 2, it should be recognized that, advantageously, more than two such layers are retained in the memory, such that a lengthy history of return data can be evaluated according to principles discussed in greater detail below herein.

The chart data is taken from a marine navigation chart database 28 that may store in memory only the present maximum radar-range extent centered on the present latitude/longitude location of the vessel.

Figure 3:
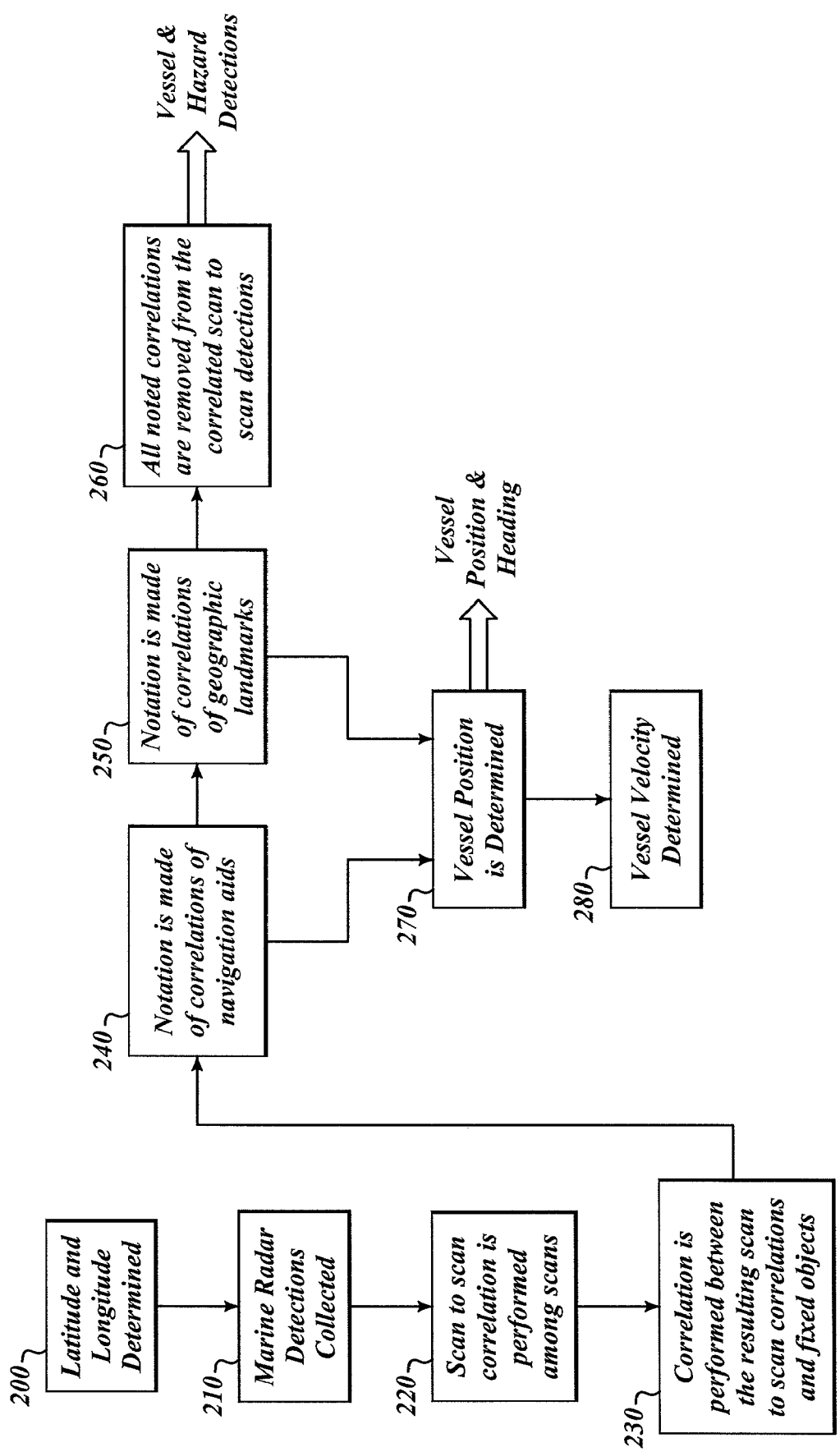
FIG. 3 is a flowchart illustrating the functionality of the system of FIG. 1.

FIG. 3 is a flowchart illustrating the functionality of the system 10 according to embodiments of the invention. At a step 200, the GPS receiver provides an indication of the latitude and longitude, and, thus, geographic location, of the vessel on which the system 10 is implemented. As such, a chart appropriate to the indicated location and range extent of the radar may be retrieved from the database 28 to be used for correlation according to principles discussed in greater detail below herein.

At a step 210, marine radar detections (radar-return data) are collected for multiple ("N") consecutive antenna 12 scans of 360 degrees by one or more of the radar navigation processor 22 and radar detection processor 24. The radar detections are stored in successive layers in the memory device 20 after having been space stabilized by signal processor 18 for the motion of the vessel using latitude and longitude inputs from GPS receiver 30, and heading, roll, pitch and yaw inputs from a gyroscope (not shown) that is associated with the vessel itself, antenna 12 and/or transceiver 16. Each 360-degree scan corresponds to one layer of data storage including a conceptual radar image that is superimposed on the marine chart data that is directly "below" it and oriented to the heading of the vessel.

At a step 220, scan-to-scan correlation is performed among the N consecutive scans by one or more of the radar navigation processor 22 and radar detection processor 24.

At a step 230, correlation is performed by one or more of the radar navigation processor 22 and radar detection processor 24 between the resulting scan-to-scan correlations and fixed objects on a marine navigation chart corresponding to the geographic location of the radar scans.

At a step 240, one or more of the radar navigation processor 22 and radar detection processor 24 determines correlations associated with navigation aids, such as buoys, day marks, etc.

At a step 250, one or more of the radar navigation processor 22 and radar detection processor 24 determines correlations associated with geographical landmarks, such as shore lines, large rocks, islets, etc. As such, one or more of the radar navigation processor 22 and radar detection processor 24 can index target returns that match with known landmarks, navigation aids, or other fixed objects and provide identification of those navigation items based on the marine chart database information.

At a step 260, the radar detection processor 24 processes the correlation data to remove the correlations associated with the navigation aids and geographical landmarks, such that the resultant correlation data set includes only data indicative of vessels and uncharted potential hazards. As such, the radar detection processor 24 removes radar detections that correspond to the fixed known objects and focuses only on those remaining detections that persist among the successive radar scans to determine eligibility as a target to be tracked. Motion or lack of motion of the detected objects that are not known navigation or geographical features are used to determine, as applicable, the location, velocity and direction of a detected target.

Alternative approaches may be used, according to embodiments of the invention, to make one or more these determinations by analyzing the relative motion of a detected target. In the first approach, the radar detection processor 24, in conjunction with the antenna 12 and transceiver 16, directly measures the component of radial velocity between a detected target and the antenna 12 during the time the target can be observed within the antenna beamwidth. This time frame is determined by the rate of scanning of the antenna 12 and the beamwidth of the antenna.

In the second approach, the radar detection processor 24 determines the direction of motion and speed of motion of a target by noting the change in location of the target between one scan-to-scan correlation period and the very next scan-to-scan correlation period. By noting the change in location of a detected target over the precise time period between two scan-to-scan correlation periods, and by accounting for the motion of the observing vessel, a very accurate measure of target speed and direction can be obtained by the radar detection processor 24.

The display device 32 can then display detected known navigation items and display data associated with such items as provided in the correlated marine chart system, as well as provide details about all detected targets, location, motion and direction.

At a step 270, the radar navigation processor 22 determines the location and heading of the vessel based on, for example, a triangulation calculation to the locations of the navigation aids and geographical landmarks previously confirmed by the correlation determinations.

At a step 280, the radar navigation processor 22 determines the position of the vessel by triangulating the intersection of relative bearing angles between known navigation aids (e.g., buoys and day marks) and prominent land details. Vessel speed and direction can be obtained by noting the change in position from one triangulation period to the next triangulation period. As such, if data from the GPS receiver 30 becomes unavailable, the system 10 is operable to otherwise provide location and navigation information to the operator of the vessel.

While a preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A radar system configured to be implemented aboard a vehicle, the system comprising:
   a memory device operable to store radar-return data characterizing at least one geographic region, the data being received by an antenna coupled to the memory device;
   a database coupled to the memory device, the database including a set of chart data representing fixed landmarks associated with the at least one geographic region; and
   a processor coupled to the memory device, the processor configured to:
      obtain from the memory device multiple sets of the radar-return data corresponding to successive scans of the at least one geographic region,
      perform correlation processing among the multiple data sets to yield a first correlated data set,
      perform correlation processing between the first correlated data set and fixed-landmark chart data associated with the at least one geographic region to yield a second correlated data set, and
      process the second correlated data set to remove said fixed-landmark chart data therefrom and yield a third data set representing scanned objects that are not fixed landmarks.

2. The system of claim 1 wherein the memory device comprises a three-dimensional buffer.

3. The system of claim 1 wherein the processor is further configured to render a depiction of the third-data-set scanned objects on a display device.

4. The system of claim 1 wherein the successive scans are 360-degree scans.

5. The system of claim 1 wherein the processor is further configured to determine at least one of velocity and direction-of-travel of the third-data-set scanned objects.

6. The system of claim 1, further comprising a radar-signal processor configured to correct the radar-return data for motion of the vehicle.

7. A computer-readable medium including instructions that, when executed by a processor onboard a vehicle, enable the processor to perform steps comprising:
   obtaining from a memory device multiple sets of radar-return data corresponding to successive scans of at least one geographic region;
   perform correlation processing among the multiple data sets to yield a first correlated data set;
   access a set of chart data representing fixed landmarks associated with the at least one geographic region;
   perform correlation processing between the first correlated data set and fixed-landmark chart data associated with the at least one geographic region to yield a second correlated data set; and
   process the second correlated data set to remove said fixed-landmark chart data therefrom and yield a third data set representing scanned objects that are not fixed landmarks.

8. The medium of claim 7 wherein the memory device comprises a three-dimensional buffer.

9. The medium of claim 7 wherein the steps further comprise rendering a depiction of the third-data-set scanned objects on a display device.

10. The medium of claim 7 wherein the successive scans are 360-degree scans.

11. The medium of claim 7 wherein the steps further comprise determining at least one of velocity and direction-of-travel of the third-data-set scanned objects.

12. The medium of claim 7 wherein the radar-return data is corrected for motion of the vehicle prior to being obtained from the memory device.

13. A radar system configured to be implemented aboard a vehicle, the system comprising:
   a memory device operable to store radar-return data characterizing at least one geographic region, the data being received by an antenna coupled to the memory device;
   a database coupled to the memory device, the database including a set of chart data representing fixed landmarks associated with the at least one geographic region; and
   a processor coupled to the memory device, the processor configured to:
      obtain from the memory device multiple sets of the radar-return data corresponding to successive scans of the at least one geographic region,
      perform correlation processing among the multiple data sets to yield a first correlated data set,
      perform correlation processing between the first correlated data set and fixed-landmark chart data associated with the at least one geographic region to yield a second correlated data set, and
      process the second correlated data set to determine, based on said fixed-landmark chart data, a geographic location of the vehicle.

14. The system of claim 13 wherein the memory device comprises a three-dimensional buffer.

15. The system of claim 13 wherein the processor is further configured to render a depiction of the geographic location of the vehicle on a display device.

16. The system of claim 13 wherein the successive scans are 360-degree scans.

17. The system of claim 13, further comprising a radar-signal processor configured to correct the radar-return data for motion of the vehicle.

18. A radar system, comprising:
   a memory device operable to store radar-return data characterizing at least one geographic region, the data being received by an antenna coupled to the memory device; and
   a processor coupled to the memory device, the processor configured to:
      obtain from the memory device a first set of the radar-return data corresponding to a scan at a first time of the at least one geographic region and a second set of the radar-return data corresponding to a scan at a second time of the at least one geographic region, the second time being later than the first time,
      perform correlation processing between the first and second data sets to yield a first correlated data set,
      obtain from the memory device a third set of the radar-return data corresponding to a scan at a third time of the at least one geographic region, the third time being later than the second time, and
      perform correlation processing between the first correlated data set and the third data set to yield a second correlated data set representing scanned objects that are not fixed landmarks associated with the at least one geographic region.

19. The system of claim 18 wherein the memory device comprises a three-dimensional buffer.

20. The system of claim 18 wherein the successive scans are 360-degree scans.

* * * * *